UNITED STATES PATENT OFFICE.

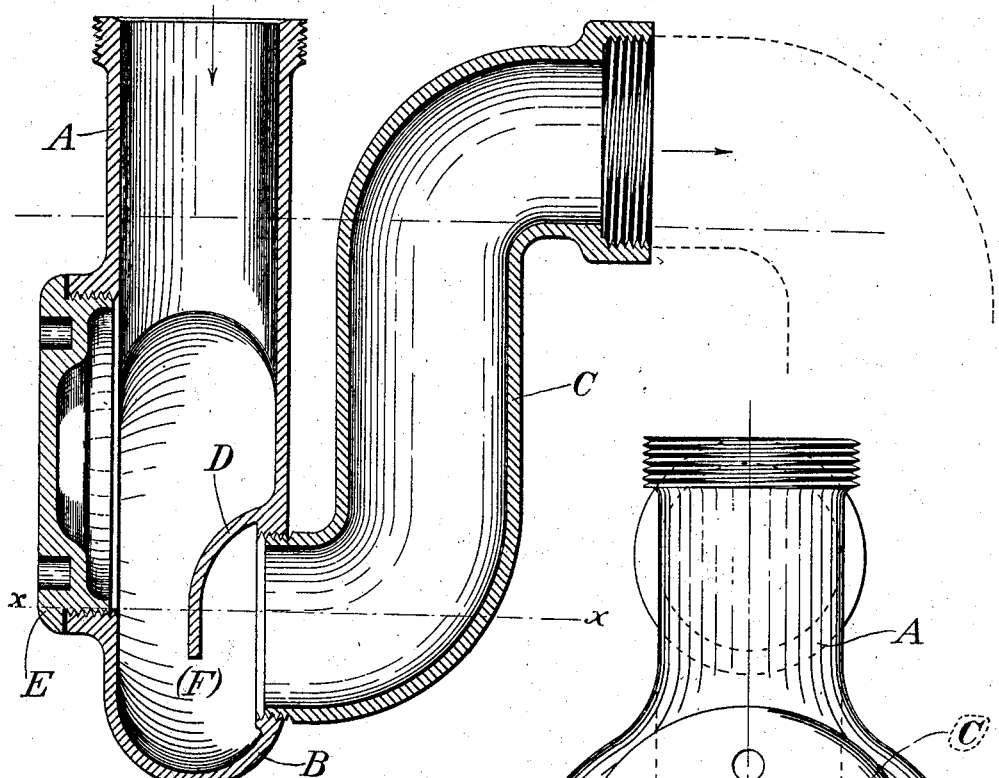
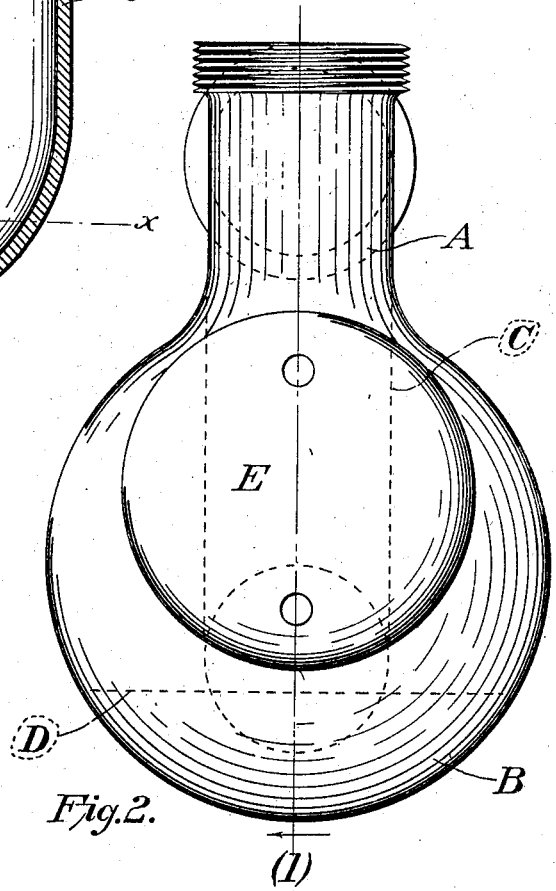

WILLIAM H. LLOYD, OF CHICAGO, ILLINOIS, ASSIGNOR TO CRANE COMPANY, OF CHICAGO, ILLINOIS, A CORPORATION OF ILLINOIS.

WASTE-TRAP.

No. 816,023.   Specification of Letters Patent.   Patented March 27, 1906.

Application filed March 9, 1904. Serial No. 197,358.

*To all whom it may concern:*

Be it known that I, WILLIAM H. LLOYD, a citizen of the United States, residing at Chicago, in the State of Illinois, have invented certain new and useful Improvements in Waste-Traps, of which the following is a specification.

My invention relates to traps for the discharge of liquids from wash-tubs, basins, water-closets and the like, designed to allow the escape of waste water without allowing of the inflow of gases. The objects of the invention are, to provide a dual seal trap having special means for lowering the water level in order to readily clean out the trap without opening the same to the passage of gases; to provide a superior trap to insure against siphonage of the liquid seal, and to generally improve the structure and operation of waste-traps. These objects, together with other advantages which will hereinafter appear, I attain by means of the construction illustrated in preferred form in the accompanying drawing, wherein—

Figure 1 is a central vertical section through the trap, and

Figure 2 is a side elevation looking from the left in Figure 1.

In the form shown it will be seen that in order to provide a double seal in the trap I have provided a casing A ending in an enlarged base portion B and connected this to the outlet leg C at the extreme bottom of the enlargement. The leg C is made of relatively small cross-section but of considerable height. Across the bottom of the chamber B I provide a partition D extending entirely across the enlarged chamber F and the mouth of the outlet leg. It is so arranged that when the plug E is removed from the casing A it will allow the ordinary water seal at the top to flow out and the level will descend to the point indicated by the line *x x*, the partition D being still beneath the surface and forming a seal to prevent the inflow of gases from C, while the space F is plainly in sight and may be conveniently cleaned out through the opening of the plug E.

It will be seen that by this construction we provide an efficient means to prevent the inflow of gas when the trap is opened to be cleaned, while the removal of the plug E directly exposes the main bowl of the trap and the water therein to be easily cleaned out and the intervening space between the water surface and the bottom of the bowl may be reached in all its parts. It is also to be noted that the large water area in the enlarged body of the trap below the dip of the second seal partition D is of greater sectional area than the upward offset leg C, and that this upward leg is of considerable length. The length of the leg provides for ample water left therein, in case of siphonage, to fall down and fill the bulb enough to close the trap D; and at the same time if a siphonage action should start, the form of the bulb B and the shelf D provides a long slotted opening for easy ingress of air to break the siphonage readily before all the water is drawn out of the bulb and this latter contains too much water to be forced out at one impulse. The opening to admit air is greatly enlarged, and a large amount of water remains in B. The attempted siphonage therefore can never break the seal at the bottom, and it will always happen that the air coming in under the lower seal partition D and escaping by the outlet leg will break the siphon and let down a sufficient quantity of water to entirely close the space under the partition D. The fluctuation of the water level in either leg can take effect in the enlarged bulb itself. This not only insures the trap against siphonage but makes it certain that under no conditions can both seals be broken for the inflow of sewer gas. Other advantages will readily occur to those familiar with the art.

Having thus described my invention and illustrated its use, what I claim as new, and desire to secure by Letters Patent, is the following:

1. In a waste trap, a casing A having an enlarged base portion B, a bent outlet leg and overflow whereby the level of the seal may be formed above the enlargement of the casing, an opening through the casing below the level of the seal, and a partition in the said enlargement near the bottom of the casing whereby a seal may be formed below the opening.

2. In a waste trap, a casing designed with an enlarged base and an outlet pipe connected thereto, and a partition across its mouth, the proportions being such that the capacity of the outlet leg of the trap is greater while its horizontal sectional area is smaller than the water space in the casing at the mouth of the outlet under the partition, whereby siphonage is prevented.

3. In a waste trap, a casing containing an enlarged base and a removable cleaning plug in the side of the same, means whereby a seal may be provided below said plug, and a bent outlet leg whereby a seal may be made above the plug when such plug is in place.

4. In a waste trap a casing having a double return bend and an enlarged body portion and an outlet leg, a removable plug at the side of the casing and below the level at which the seal is formed when the plug is in place and a cross partition near the bottom of the enlargement below the opening of the plug and partially covering the outlet, whereby when the plug is removed a seal may be formed at a level below the plug.

5. A waste trap comprising a casing with a bend and a downward dip and return outlet, a removable plug in the side of the casing below the level at which the seal is formed when the plug is in place, an enlargement at the base of the casing below the plug, and a partition dipping below the plug opening across the enlarged base, the proportions of parts being such that the outlet leg is of greater capacity but of less horizontal sectional area than the casing at the edge of the said partition.

6. In combination, vertical inlet and outlet pipes connected at their lower extremities, the outlet pipe curving horizontally at the upper end, a removable plug near the bottom of the inlet pipe and a depending partition in the passage between the pipes which extends below the lower edge of the plug.

In testimony whereof I have hereunder signed my name in the presence of the two subscribed witnesses.

WILLIAM H. LLOYD.

Witnesses:
PAUL CARPENTER,
EDWARD C. BURNS.